United States Patent [19]

Prey

[11] 4,212,060
[45] Jul. 8, 1980

[54] METHOD AND APPARATUS FOR CONTROLLING THE SEQUENCE OF INSTRUCTIONS IN STORED-PROGRAM COMPUTERS

[75] Inventor: Gerhard Prey, Munich, Fed. Rep. of Germany

[73] Assignee: Siemens Aktiengesellschaft, Munich, Fed. Rep. of Germany

[21] Appl. No.: 941,155

[22] Filed: Sep. 11, 1978

Related U.S. Application Data

[63] Continuation of Ser. No. 681,057, Apr. 28, 1976, abandoned.

[30] Foreign Application Priority Data

Apr. 30, 1975 [DE] Fed. Rep. of Germany ....... 2519395

[51] Int. Cl.² .............................................. G06F 9/00
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 3,401,376 | 9/1968 | Barnes et al. | 364/200 |
| 3,445,817 | 5/1969 | Criscimagna | 364/900 |
| 3,551,895 | 12/1970 | Driscoll | 364/200 |
| 3,553,655 | 1/1971 | Anderson et al. | 364/200 |
| 3,577,189 | 5/1971 | Cocke et al. | 364/200 |
| 3,577,190 | 5/1971 | Cocke et al. | 364/200 |
| 3,745,533 | 7/1973 | Erwin et al. | 364/200 |
| 3,980,991 | 9/1976 | Mercurio | 364/200 |

Primary Examiner—Mark E. Nusbaum
Attorney, Agent, or Firm—Schuyler, Birch, McKie & Beckett

[57] ABSTRACT

A method and apparatus for controlling the instruction sequence in a stored program data processing system is described. An interrogation instruction causes the execution of a conditional check. As a result of this conditional check, one or the other of two bistable circuits is activated in dependence on the presence or absence of the prespecified condition. In an alternative embodiment, the apparatus can be modified to permit activation of both bistable circuits. One of the bistable circuits, when set, prevents execution of the next instruction in the instruction sequence. The setting of the other bistable circuit prevents execution of the next jump instruction occurring in the instruction sequence. A control signal in the interrogation instruction indicates which of the bistable circuits is to be set.

3 Claims, 2 Drawing Figures

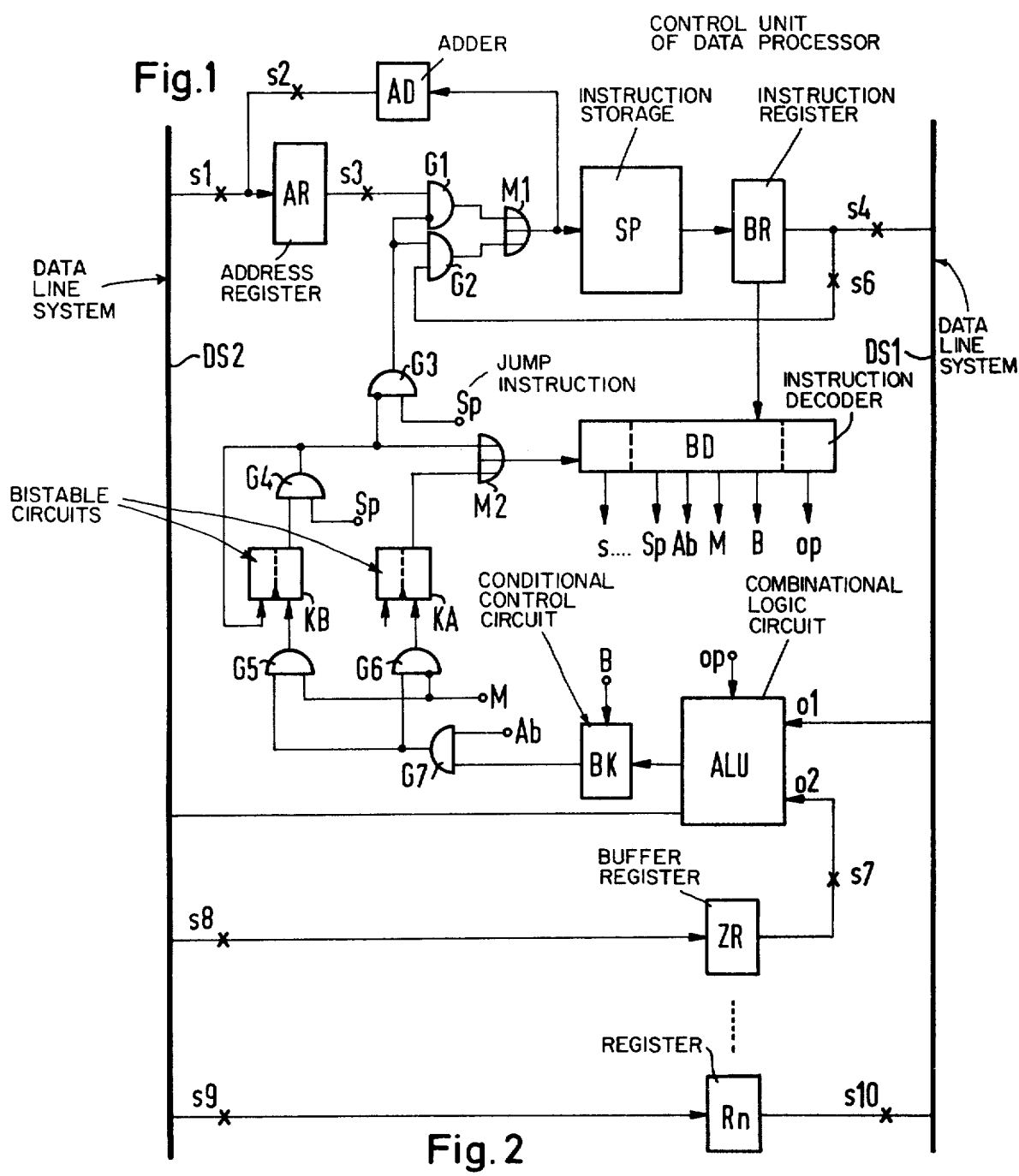
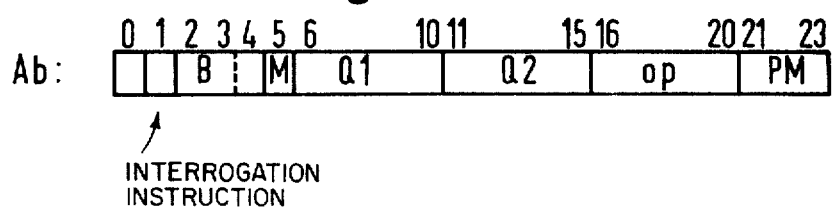

METHOD AND APPARATUS FOR CONTROLLING THE SEQUENCE OF INSTRUCTIONS IN STORED-PROGRAM COMPUTERS

This is a continuation of application Serial No. 681,057, filed Apr. 28, 1976, now abandoned.

BACKGROUND OF THE INVENTION

This invention relates in general to a method and apparatus for controlling the sequence of instructions in stored-program computers.

The sequence in which instructions are executed in stored-program computers may be changed by branch instructions. Aside from unconditional jumps, these branch instructions usually consist of two functions, viz. the verification of the presence of a specified condition and, if that condition is found, a transition to the next sequence instruction. This transition may consist of an incrementation of the instruction counter by two or n steps, instead of only one step (skip instruction), i.e., the next or the next n-1 instructions of the sequence are skipped. Alternatively, the transition may consist of a transfer of a new instruction address derived from the jump instruction to the instruction counter, after which the instruction sequence is carried on.

If both facilities for changing the instruction sequence are provided in a system, the skip instruction requires additional measures for changing the instruction address.

It is an object of the invention to provide means and method for simplifying the instruction sequence control and making it more flexible.

SUMMARY OF THE INVENTION

In accordance with the principles of this invention, the foregoing and other objects are achieved in that in an interrogation instruction only a conditional check is carried out and, depending on whether the specified condition is met or not met, one or the other of two bistable control circuits is set, of which one bistable circuit prevents the execution of the next provided instruction of the instruction sequence, after which this one bistable circuit switches back to the rest condition. The other bistable circuit prevents the execution of the first jump instruction following next in the instruction sequence. Thereafter, this other bistable circuit switches back to the initial condition. The decision as to which of the bistable control circuits shall be set is made by a control signal in the interrogation instruction. In an alternative embodiment, the apparatus can be modified to permit activation of both bistable circuits.

Accordingly, this invention divides the branch operation into an actual interrogation instruction for checking the presence of a predetermined condition and an unconditional jump instruction. The result of the conditional check is held in both bistable conditional circuits. The bistable conditional circuits then determine if a read-out instruction can actually be executed or not.

The non-execution of an instruction has the effect of a skip instruction, wherein an instruction of the sequence is omitted. Thus, if the instruction following the interrogation instruction is a jump instruction, the branching can be bypassed, if the instruction is blocked. A change of address is not necessary. Certainly, every jump instruction that has not been carried out means the loss of an instruction execution cycle. However, the invention enables uniform control even in the event that after an interrogation instruction other instructions have to be carried out first until a jump instruction arrives that shall be skipped or not skipped, depending on the conditional check effected by the interrogation instruction. This has the advantage over the prior art that with initially identical instruction sequences in both branches, after a branch point, the instructions need be provided only once and, hence, economies can be realized on storage space in the instruction storage.

A very simple and flexible instruction sequence control is thus obtained which is especially suited for simple control units having a limited number of control functions.

BRIEF DESCRIPTION OF THE DRAWINGS

Further details of the invention will be described hereinbelow with reference to a preferred embodiment which is illustrated in the drawings, wherein:

FIG. 1 is a schematic circuit diagram for a control unit of a data processor in accordance with the invention, and FIG. 2 is a diagram illustrating the arrangement of an exemplary interrogation instruction used in connection with the FIG. 1 embodiment.

DETAILED DESCRIPTION OF THE PREFERRED EMBODIMENT

The control unit shown in FIG. 1 forms part of a data processor which may, for example, be constructed in accordance with the data processor described in U.S. Pat. No. 3,631,401, wherein, in a known manner, the individual units such as control unit, data storage device and input/output terminals for peripheral equipment are disposed as modules between two data and control line systems DS1 and DS2.

Instruction storage SP is associated with the control unit and can be activated by and a given instruction selected from address register AR which identifies the storage location of the next instruction of the operating program. Aside from jump instructions or other address modifications, the address sequences are obtained by continuous incrementations of 1. To achieve this, the addresses awaiting processing in the address register are coupled to a 1-adder AD and back to address register AR with each storage selection. Using an instruction counter, which can be preset, as an address register, the adder can be dispensed with in the customary manner. The instructions selected in storage SP are transferred to instruction register BR and fed from there to instruction decoder BD which affects in a known manner the switching instructions of the sequence control. A conventional form of instruction decoder is contemplated, and an example of a suitable such device for use herein is the instruction decoder 40 found in FIG. 1A of U.S. Pat. No. 3,577,189.

Other components of the control unit are the combinational logic circuit ALU, which at the same time interconnects the two data line systems DS1 and DS2 for the data interchange, and several registers, e.g., ZR and Rn. The combinational logic circuit operates in customary manner on operands 01 and 02 fed thereto in dependence on the operation op decoded by instruction decoder BD and transfers the result to data line system DS2 for possible transfer by one of the activated units, e.g., one of the registers R . . . or the data storage device not shown herein. More particularly, operand o2 is transferred to buffer register ZR from the unit supplying such operands via data bus DS1, combinational logic unit ALU and data bus DS2. In a subsequent cycle operand o2 is transferred to the corresponding input of logic element ALU, while the other operand is fed to the other input o1. The result of the operation of the combinational logic unit on both operands is then routed via data bus system DS2 to the unit accepting this result. Thus, the register ZR is a buffer register for supplying the second operands to the combinational logic element ALU. The operating registers for buffering individual data words are labeled Rn.

Also connected to the combinational logic circuit is a conditional control circuit BK which checks the result supplied by the combinational logic circuit as a function of condition B (FIG. 2) decoded by instruction decoder BD and controls the further instruction handling routine. Thus, conditional control circuit BK may be any well-known device for determining whether the value of a data word is greater or less than a predetermined value. A suitable such device is the conditional register 56 in U.S. Pat. No. 3,577,189 (FIG. 1C). To do this, two bistable circuits KA and KB are connected in accordance with the invention to the output of conditional control BK of the bistable circuits KA and KB is set through gates G5 to G7 with an interrogation instruction Ab and in dependence on a control mark M (FIG. 2) in the instruction. As is apparent from FIG. 1, the control mark M is supplied to the bistable circuit KA through a blocking gate G6 whereas the control mark M is supplied to bistable circuit KB through an AND gate G5. As a result, in this preferred embodiment, one or the other of the bistable circuits KA and KB is activated by the control mark M.

The bistable control circuit KA prevents the instruction following an interrogation instruction Ab and transferred in instruction register BR from being executed, and bistable circuit KB prevents, via gates G3 and G4, a subsequent jump instruction Sp from being executed. The blocking of the individual instructions is carried out in simple fashion by suppressing the signals determining the sources and destinations of a data interchange over date line systems DS1 and DS2 supplied by the sequence control for the switches s . . . .

FIG. 2 shows the arrangement of an interrogation instruction employed with the data processor control unit of FIG. 1 and comprising a total of 24 bits. Bits 2 to 4 identify the condition B to be checked, with bit 4 indicating if the fulfilment or non-fulfilment of the selected condition B shall be evaluated or not. Bit 5 contains the details M concerning the bistable circuits to be set. Q1 and Q2 identify the sources to be linked, the data of which are applied as operands 01 and 02 to combinational logic circuit ALU, op designates the operation to be carried out, and bits 21 through 23 contain check marks, e.g., parity character, for the transfer and sequence check.

The principles of operation of the FIG. 1 embodiment are described below.

Blocking gate G1 is normally open and instruction storage SP is continually activated via OR gate M1 with addresses from address register AR. The instructions written into instruction register BR are decoded in instruction decoder BD and executed. In the presence of interrogation instructions Ab, one of the bistable circuits KB or KA is set by AND gate G7 and one of the gates G5 and G6 in dependence on the specified condition B and the control mark M. Bistable circuit KA acts through OR gate M2 directly on the instruction decoder, so that with the next instruction the switches S1-S10 controlled by outputs s . . . of the instruction decoder BD are not operated, i.e., the instruction following the interrogation instruction Ab is not executed. The sequence instruction may be any desired instruction. In the case of a jump instruction Sp, the jump would be omitted and, thus, a possible branching is not carried out.

Bistable circuit KB is set if the instruction immediately following the interrogation instruction is not to be omitted, but a subsequent jump instruction Sp is. In this case, the switchover between blocking gate G1 and AND gate G2 is stopped via AND gate G4 and blocking gate G3, so that the jump address held in instruction register BR cannot affect instruction storage SP. However, if bistable circuit KB is not set, the jump address is fed to instruction storage SP via blocking gate G3 and AND gate G2, so that a branching is initiated. Thus, for example, a transfer instruction following the interrogation instruction Ab can be omitted, and a subsequent jump instruction can be executed and vice versa. Another possibility would be provided if both bistable control circuits KA and KB could be set simultaneously. In this case, the gate circuit G5 and G6 for activating bistable circuits KA and KB would have to be modified accordingly and a further bit in the interrogation instruction would have to be expended for the control mark M to identify the combination. Of course, in this alternative embodiment, two instructions following the interrogation instruction, the latter of which is a jump instruction, can be omitted.

The method and apparatus of the invention provide for a very flexible sequence check which can be performed in simple fashion and with very little technical complexity.

Preferred forms of the method and apparatus of the invention are described hereinabove. The described embodiment of the apparatus and its principles of operation are to be considered only as being exemplary, and they can be modified or changed in a number of ways known to those skilled in the art while remaining within the scope of the invention as defined by the appended claims.

I claim:

1. In a program controlled data processing system, a control unit for controlling the instruction sequence in said data processing system, said control unit having an instruction storage unit for storing instructions, said control unit comprising:

instruction decoding means coupled to said instruction storage unit for decoding the instructions received from the instruction storage unit to generate control signals;

execution means coupled to said instruction decoding means for executing the instructions in accordance with the control signals;

checking means for determining the presence or absence of a prespecified condition in response to the decoding of an interrogation instruction by said instruction decoding means;

first and second bistable circuits;

first setting means responsive to the decoding of a control mark in the interrogation instruction by said instruction decoding means and the presence or absence of the prespecified condition for setting said first bistable circuit;

second setting means responsive to the decoding of the control mark in the interrogation instruction by said instruction decoding means and the presence or absence of the prespecified condition for setting said second bistable circuit;

first blocking means connected to said instruction decoding means and responsive to the setting of said first bistable circuit for preventing the execution of the next instruction in the instruction sequence by suppressing the control signals generated by said instruction decoding means; and second blocking means connected to said instruction decoding means and responsive to the setting of said second bistable circuit together with the occurrence of a jump instruction signal Sp being read out of said instruction storage unit for preventing execution of the next following jump instruction in the instruction sequence by suppressing the control signals generated by said instruction decoding means for the next following jump instruction, said second blocking means including gate means connected to said instruction storage unit for preventing the instruction storage unit from receiving the branch address associated with the next jump instruction in response to the setting of said second bistable circuit and the occurrence of a jump instruction signal Sp.

2. A method of operating a control unit in a data processing system for controlling the sequence in which instructions are carried out, said data processing system having an instruction storage unit for storing instructions, the method comprising the steps of:

receiving and decoding interrogation instructions to generate control signals;

executing instructions, including the interrogation instruction, in accordance with the control signals;

checking to determine whether a prespecified condition is present or absent in response to the decoding of an interrogation instruction;

setting a first bistable circuit in response to the decoding of a control mark in the interrogation instruction and the presence or absence of the prespecified condition in the checking step;

setting a second bistable circuit in response to the decoding of the control mark in the interrogation instruction and the presence or absence of the prespecified condition in the checking step;

preventing the execution of the next succeeding instruction in the instruction sequence in response to the setting of said first bistable circuit by suppressing the control signals; and blocking the execution of the next following jump instruction in the instruction sequence in response to the setting of said second bistable circuit and the occurrence of a jump instruction signal Sp being read out of said instruction storage unit by suppressing the control signals associated with the next following jump instruction and preventing the instruction storage unit from receiving the branch address associated with the next following jump instruction.

3. The program controlled data processing system according to claims 1 or 2 wherein said first and second bistable circuits can be set simultaneously.

* * * * *